Feb. 26, 1924.  
W. G. HAEHL  
1,485,182  
CLUTCH PEDAL HOLDER OR RETAINER  
Filed Aug. 18, 1923

INVENTOR.  
William G. Haehl,  
BY  
Geo. P. Kimmel  
ATTORNEY.

Patented Feb. 26, 1924.

1,485,182

UNITED STATES PATENT OFFICE.

WILLIAM G. HAEHL, OF MANILLA, INDIANA.

CLUTCH-PEDAL HOLDER OR RETAINER.

Application filed August 18, 1923. Serial No. 658,129.

*To all whom it may concern:*

Be it known that I, WILLIAM G. HAEHL, a citizen of the United States, residing at Manilla, in the county of Rush and State of Indiana, have invented certain new and useful Improvements in Clutch-Pedal Holders or Retainers, of which the following is a specification.

This invention relates to a clutch pedal holder or retainer, designed primarily for use in connection with tractors of the Ford type, but it is to be understood that a clutch pedal holder, in accordance with this invention can be employed for use with any type of machine for which it is found applicable, and the invention has for its object to provide, in a manner as hereinafter set forth, a holder or retainer for releasably securing a clutch pedal in operative position during the operation of a tractor to overcome the inconvenience of maintaining the foot constantly on such pedal to hold the latter in the position referred to.

Further objects of the invention are to provide, in a manner as hereinafter set forth, a clutch pedal holder or retainer for the purpose set forth, which is simple in its construction and arrangement, readily applied to a tractor body without changing the construction thereof in any manner, strong, durable, resilient, thoroughly efficient and convenient in its use, and inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
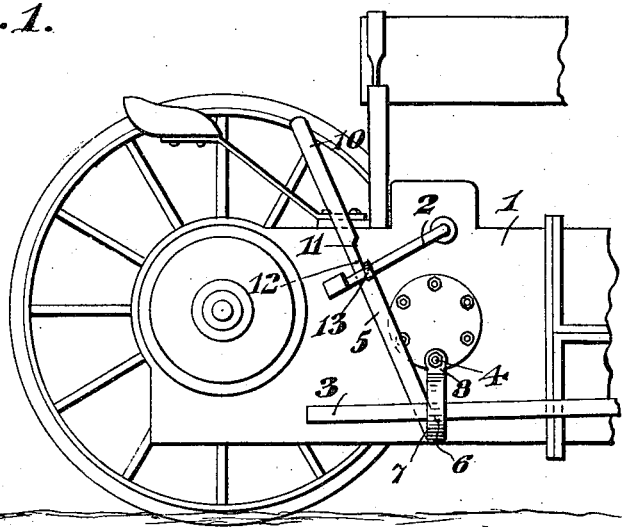
Figure 1 is a fragmentary view, in side elevation, of a tractor showing the adaptation therewith of a clutch pedal holder or retainer, in accordance with this invention.
Figure 2:
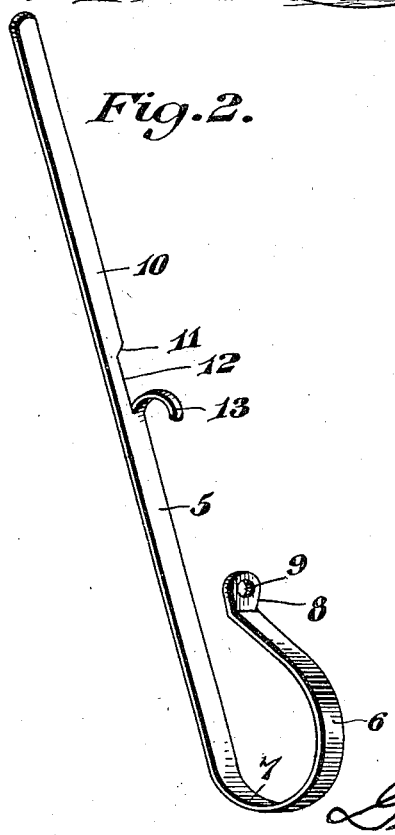
Figure 2 is a perspective view of a clutch pedal holder or retainer, in accordance with this invention.
Figure 3:
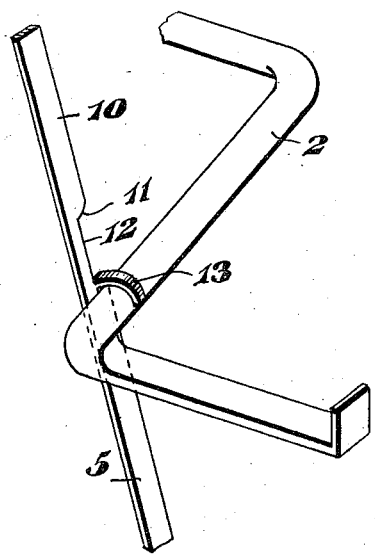
Figure 3 is a fragmentary view, in perspective, illustrating the hook element of the holder or retainer.

Referring to the drawings in detail, 1 denotes the body portion of a tractor, 2 the clutch pedal and 3 the exhaust pipe or manifold of a tractor.

A clutch pedal holder or retainer, in accordance with this invention, is formed from a substantially elongated narrow bar of spring metal and which is so constructed as to have its lower portion extend around the exhaust manifold 3 and fixedly secured to the body portion 1 of the tractor, as at 4, and furthermore so set up with respect to the clutch pedal 2 as to normally be positioned in the path of the pedal 2, so that when the latter is shifted to operative position, it can be moved to a position with respect to the holder or retainer whereby the latter will engage over the pedal 2 and maintain it in operative position during the operation of the tractor, so as to overcome the inconvenience of maintaining the foot constantly on the pedal to hold it in the position referred to.

A combined clutch pedal holder or retainer in accordance with this invention, includes a substantially elongated resilient arm 5 which terminates at its lower end in an upwardly extending offset arcuate coupling portion 6, and the said holder or retainer, at the point of joinder between the arm 5 and the coupling portion 6, is rounded, as at 7. The arm 5 is extended at an inclination with respect to the coupling portion 6. The coupling portion 6 terminates in a vertically disposed lug 8, provided with an opening 9 for the passage of the securing means 4 to secure the clutch pedal holder or retainer to the tractor body 1.

The lower part of the arm 5 is positioned at one side of the exhaust manifold 3, and the coupling portion 6 is extended around the other side of the exhaust manifold 3, and by this arrangement when the lug 8 is fixedly secured to the body portion 1 of the tractor, the lower portion of the clutch pedal holder or retainer surrounds the exhaust manifold 3, and further as the lower portion of the arm 5 is not fixedly secured to the body portion 1 of the tractor, said arm is unusually resilient and which allows the same to be shifted laterally with respect to the clutch pedal 2 to allow for the lowering movement of the pedal 2, and after the pedal has been shifted to the desired position, the arm 5 can spring back in abutting position with respect to the clutch pedal 2.

The arm 5, near its upper end, is provided with a slit which extends inwardly from the edge 10 of the arm 5 at a downward inclination for a portion of the width of the arm 5, and the slit is then extended in a direction lengthwise of the arm 5. The inclined portion of the slit is indicated at 11, and that part of the slit which extends lengthwise of the arm 5 is indicated at 12, and is of materially greater length than the inclined portion 11. The material of the arm 5, which is freed by the slit is bent outwardly from one face of the arm 5, and shaped in an arcuate manner to provide a holding hook 13, which is disposed laterally with respect to the arm.

The hook 13, when the pedal 2 is depressed, is adapted to overlap the pedal 2 for the purpose of retaining the latter in operative position.

If it be desired to release the pedal 2, it is depressed slightly below the hook 13, the arm 5 is shifted slightly away from the pedal 2 so that when the pedal is released it will clear the hook 13 on its upward movement. Owing to the resiliency of the arm 5 after it has been manually shifted away from the pedal 2, it will automatically spring back to normal position when the hand is released from the arm 5.

When the pedal 2 is seated in the hook 13, its tendency is to move upwardly thereby setting up a binding action between the pedal and the hook, under such conditions as the clutch pedal holder or retainer is secured to the body portion 1, the pedal 2 will be maintained in its depressed position until it is released in the manner as heretofore stated.

Although the preferred embodiment of the clutch pedal holder or retainer in accordance with this invention, is as illustrated and described, yet it is to be understood that changes in the details of construction can be had which will fall within the light of the invention as claimed.

What I claim is:—

1. A clutch pedal holder or retainer comprising a substantially elongated bar of metallic material bent to provide an elongated resilient arm and an arcuate coupling portion, said coupling portion aperture for the passage of a hold-fast device to secure the bar in position, said arm extending at an inclination with respect to said coupling portion and provided intermediate its ends with a slit extending inwardly from one edge and further lengthwise of its center and with the material freed by the slit extended laterally with respect to the arm and bent in arcuate form to provide a hook downwardly disposed.

2. A clutch pedal holder or retainer comprising a substantially elongated bar of metallic material bent to provide an elongated resilient arm and an arcuate coupling portion adapted to overlap the exhaust pipe of a tractor, said coupling portion adapted to be fixedly secured to the tractor and said arm extending a substantial distance above said coupling portion, and at an angle with respect to said arm provided intermediate its ends with a slit and with the material freed by the slit bent to extend laterally with respect to the arm to provide a downwardly disposed retaining hook for a clutch pedal.

3. A clutch pedal holder or retainer comprising a substantially elongated bar of metallic material bent to provide an elongated resilient arm and an arcuate coupling portion adapted to overlap the exhaust pipe of a tractor, said coupling portion adapted to be fixedly secured to the tractor and said arm extending a substantial distance above said coupling portion, said arm slitted intermediate its ends at one side thereof and with the material freed by the slit bent to extend laterally with respect to the outer face of the arm to provide a downwardly disposed retaining hook for a clutch pedal, said coupling portion having its free terminal portion in the form of a lug provided with an opening for the passage of a securing means to connect the bar to the tractor.

In testimony whereof, I affix my signature hereto.

WILLIAM G. HAEHL.